Patented Aug. 9, 1949

2,478,298

UNITED STATES PATENT OFFICE 2,478,298

PROCESS FOR PREVENTING CRYSTALLIZATION OF ARGOLS IN GRAPE PRODUCTS

Eldon Everett Meschter, Glenside, Pa., and Kasson Walker Seiter, Westfield, N. Y., assignors to Grape Belt Preserve Company, Westfield, N. Y., a corporation of New York No Drawing. Application April 2, 1946, Serial No. 659,150

8 Claims. (Cl. 99—105)

This invention relates to a process, incident to the packing of grape products such as grape juice, jam and jelly, for treating the objective grape material to prevent the formation of crystallized potassium bitartrate in the packed product. The presence of the crystallized bitartrate is not harmful, but in bottled grape juice it would appear as an objectionable sediment, while in the more dense products, as jam and jelly, it is distributed through the mass and readily mistaken by the consumer for sand, dirt, chips of glass, etc. The crude crystals of potassium bitartrate are known as argols.

It has been the common practice in the manufacture of grape products to store juice for several months after expression and before use, in order to allow the potassium bitartrate crystals to form and settle. Various methods have been used to hasten crystallization, such as cooling the juice or even freezing the juice to a slush and centrifuging, in which case the juice can be substantially freed from supersaturation of bitartrate. Such methods require that all the juice be treated. Also, in the manufacture of bottled grape juice, it has been necessary to have a storage period not only to allow the bitartrate to settle out, but to allow coagulated protein and similar material, which would ultimately cloud the juice, to separate and settle. Treatment or storage of large volumes of juice is expensive and time consuming.

One of the objects of the present invention is to provide a process whereby grape jam, grape jelly, and grape juice may be packed directly from fresh grapes, without the ultimate crystallization of potassium bitartrate and without requiring the customary storage period necessary for crystallization of the potassium bitartrate, when it is present in sufficient amounts to form a supersaturated solution, down to the point of saturation.

Another object of the invention is to remove all cations from the grape juice, but especially potassium at least in an amount sufficient to reduce the concentration of potassium bitartrate in solution from a supersaturated to a saturated or to less than a saturated condition, and preferably to reduce to the ultimate extent so that the treated juice may be used as a diluent for untreated juice, to bring the concentration of potassium bitartrate in the mixture below the point of saturation.

Another object of the invention is to increase the hydrogen ion content of grape products by effecting an ion exchange of hydrogen for metallic ions by the use of either natural or synthetic, ion exchange materials including resinous and carbonaceous types.

A further object of the invention is to provide a process whereby potassium ions are removed from grape products by the use of either natural or synthetic, ion exchange materials to such an extent that the potassium content is insufficient to satisfy the tartrate content which would ultimately crystallize in grape products, such as jam, jelly or grape juice, in the form of crude potassium bitartrate, sometimes called argols.

Still another object of the invention is to provide a process whereby slightly soluble potassium bitartrate is substantially converted to soluble tartaric acid by the ion exchange of hydrogen for potassium in the grape products so that in many cases a more favorable hydrogen ion concentration, pH, for solution of the potassium bitartrate and even for gelation is developed.

Other objects of the invention will appear as the following description of the process proceeds.

The process of the present invention involves ion exchange in which potassium ions are exchanged for hydrogen ions on an ion exchange material in such a way and to such an extent that very little potassium bitartrate remains in solution. Consequently, the juice may contain a higher percentage of tartrate as tartaric acid than would ordinarily be present in grape products because ordinarily the potassium bitartrate crystallizes and thus separates from solution upon standing. However, due to the lack of potassium, which has been removed and exchanged for hydrogen, the tartrate remains as the soluble acid rather than the slightly soluble bitartrate.

In the following illustrative examples the use of a synthetic resinous type ion exchange material is described, such as is covered by U. S. Patents Nos. 2,104,501, 2,151,883 and 2,191,853. The invention is not limited to this use, for other eligible types are known such as the carbonaceous ion exchanger covered by U. S. Patent No. 2,206,007.

In the practice of the invention, a bed of the ion exchanger is provided. The ion exchanger bed may take the form of a column held in place by a glass tubular device, the visual feature of which is important in permitting observation of the resin when back washing, to prevent loss of resin. Or the resin container can be a tank or even a cloth filter bag. The depth of the resin bed through which the grape juice should flow should be of the order of 30 inches to give effective results, although the depth dimension may be varied between wide limits, according to conditions attending its use.

In general, one cubic foot of cation exchange resin is sufficient to treat 40 gallons of normal quality, freshly pressed, undiluted grape juice. After the passage of this approximate quantity of juice through the exchanger bed, the resin exchange material becomes exhausted. The exhaustion point is indicated by the break through of juice containing a substantial amount of potassium ions. Regeneration of the cation exchanger is accomplished by passing dilute mineral acid, such as hydrochloric or sulphuric, through the exchanger bed. In the case of hydrochloric acid, an acid concentration of from 3 to 7% is generally employed, the amount of acid used at 37% concentration being from 2 to 10 pounds per cubic foot of exchanger material. The exchanger material may be regenerated several times but each time its capacity becomes less, so that it is finally discarded.

Before passing the grape juice through the exchanger bed, it is desirable to filter the juice. If this is not done, the exchanger bed acts as a filter and in a short time the upper portion becomes clogged with suspended matter which stops the flow of juice. It is at times necessary to first treat viscous juice with a pectin degradant such as pectic enzymes in order to reduce the viscosity sufficiently to attain easy filtration, and free passage of the juice through the exchanger bed.

The constitutents of grape material vary according to variety, season, and other factors, but by way of illustration, a specific sample of untreated fresh grape juice showed upon analysis a potassium content of 0.15% of the total weight of the juice. After this juice, supersaturated with potassium bitartrate, had been stored for a sufficient length of time, the excess potassium bitartrate crystallized out, the supernatant liquid then showed a potassium content of 0.12%. Thus, a reduction of 0.03% of potassium was effective in the prevention of the further formation of potassium bitartrate crystals.

When a portion of this same sample of untreated fresh grape juice was treated by contacting with a synthetic cation resin exchanger, the potassium content was reduced to 0.003% of the weight of the juice. This made it possible to mix one part of the treated juice with approximately four parts of untreated juice, to obtain a mixture in which the potassium content does not exceed the 0.12% concentration which was found by the storage trials reported above to be effective in the prevention of the further formation of potassium bitartrate crystals. Proper mixing proportions can be calcuated for juice having other potassium contents. This method of removing nearly all of the potassium from a fraction of the juice works well in practice and establishes economy in working the process, since much less of the relatively expensive cation exchanger is required than if the entire batch of juice were passed through the exchanger bed.

The process actually affects all of the cations in solution in the juice. It can be assumed that the cations normally present in fresh grape juice are sodium, potassium, magnesium, and calcium. Contaminating cations, such as lead and copper, may also be present. Since the cation exchanger is not selective for any particular cation, each of these cations will be removed from the juice and a hydrogen ion will be given up in its stead, thus acidity will increase. pH values as low as 1.8 have been observed in ion-exchanged juice, the flavor of which has not been altered other than by its highly acid qualities. The aroma and natural flavor esters do not appear to be changed and a sample of the original juice containing 20% of treated juice maintains its original character, except for the increase in acid content. Since the original juice is a highly buffered mixture, the resulting pH of the mixture of 20% treated and 80% untreated juice is approximately 3.1. Under proper conditions the increased acidity increased the solubility of potassium bitartrate and even aided gelation in some cases.

In the preparation of grape juice for bottling, according to the present process, fresh grape juice from the pressing operation is treated to destroy natural pectins, if they are not desired, by customary enzymic methods and filtered to remove sedimentary substances. It is then passed through a cation exchange bed to remove at least sufficient amounts of the potassium ion to make the solution less than saturated with respect to its potassium bitartrate content. Since other sedimentary materials besides potassium bitartrate crystals may affect untreated grape juice, it may be preferred to run the entire batch of grape juice through the cation exchanger under conditions which remove only sufficient of the cations to bring the potassium content of the juice just below the saturation point with respect to its potasium bitartrate content, rather than by reducing the potassium ion content to the ultimate in a fraction of the batch and mixing this with an untreated portion. It is possible to control the resulting potassium content by rigid control of the contact time of the juice with the resin. Grape juice may be only partially reduced as to its cation content by rapid controlled flow through the exchanger. The juice can now be bottled with no ultimate sedimentation of the potassium bitartrate.

In making grape jelly from fresh grapes, the method outlined for bottled juice is used to the point where all or part of the cations are removed from all or part of the juice essentially to such extent that the amount of potassium remaining in the juice to be used for jelly manufacture is not sufficient to allow a supersaturated solution of potassium bitartrate to exist in the finished jelly, consequently, preventing the formation of argols in the jelly, without the necessity of a relatively long storage period for the sedimentation of the juice. After a portion or all of the juice for jelly manufacture has been treated, the potassium content of the material can be adjusted by adding fresh untreated grape juice to treated grape juice, keeping within the range where the potassium to tartrate ratio is not favorable for the ultimate precipitation of potassium bitartrate.

In the manufacture of grape jam directly from fresh grapes, the process proceeds as follows: After the fresh grapes are crushed and heated to extract the color, a large portion of juice is freed from the fruit. Since the fruit fiber itself can not be put through an exchanger bed, the free-run juice is separated from the fruit fiber and after filtering, if desired, the juice is ion-exchanged to lower its cation content sufficiently to prevent ultimate crystallization of potassium bitartrate in the final mixture when fruit fiber and treated juice are remixed and used in normal manufacturing procedure.

Another method of treating grape pulp for grape jam can be effected by adding the required amount of ion exchange material directly to the pulp mass with constant stirring. After the capacity of the exchanger has been exhausted, the exchanger is allowed to settle, or separated from the grape material by centrifuging.

While we have in the above description disclosed a process of treating grape products which involves the employment of an ion exchange material for removing potassium to prevent ultimate crystallization of potassium bitartrate in grape products, it will be understood by those skilled in the art that the implementation of the process is flexible and that the specific examples herein set forth are not to be construed as limiting the scope of the invention.

What we claim as our invention is:

1. Process for preventing the crystallizing of argols in fresh grape juice comprising partially reducing the potassium content of the grape juice to such an extent that the concentration of potassium bitartrate in the juice is less than that of a saturated solution, by contacting the grape juice with an ion exchanger in hydrogen cycle.

2. Process for preventing the crystallizing of argols in fresh grape products containing grape juice comprising partially reducing the potassium content of the grape juice to such an extent that the concentration of potassium bitartrate in the product is less than that of a saturated solution, by contacting at least part of the grape juice with an ion exchanger in hydrogen cycle.

3. Process for treating grape juice to prevent crystallization of argols in a grape product, of which the juice forms at least a part, comprising treating a quantity of fresh grape juice by contacting the grape juice with ion exchanger in hydrogen cycle until the potassium content of said quantity is reduced to such extent that the concentration of potassium bitartrate in the juice is substantially below saturation, and mixing said treated grape juice with untreated fresh grape juice in such ratio as to keep the concentration of the potassium bitartrate in the mixture below saturation.

4. Process for preventing the crystallizing of argols in a grape product containing the fibrous as well as the juice portion of the grape, comprising separating at least a portion of the juice from the fiber, treating this portion of fresh juice by passing it through a bed of ion exchanger in hydrogen cycle until the potassium content is reduced to such extent that the concentration of potassium bitartrate is substantially below saturation, and then adding the treated juice to the fiber in such ratio as to keep the concentration of the potassium bitartrate in the mixture below saturation.

5. Process for preventing the crystallization of argols in fresh grape juice comprising partially reducing the potassium ion concentration and raising the hydrogen ion concentration of the grape juice to such an extent that the concentration of potassium bitartrate in the juice is less than that of a saturated solution under the conditions of increased acidity, by contacting the grape juice with an ion exchanger in hydrogen cycle.

6. Process for preventing the crystallizing of argols in fresh grape products made from a grape mass including the fibrous portion of the grape and grape juice, comprising partially reducing the potassium content of the mass to such an extent that the concentration of potassium bitartrate in the mass is less than saturated, by contacting the mass with an ion exchanger in hydrogen cycle.

7. Process for preventing the crystallizing of argols in fresh grape juice comprising partially reducing the potassium content of the grape juice to such extent that the concentration of potassium bitartrate in the juice is less than saturated, by contacting the grape juice with a resinous ion exchanger in hydrogen cycle.

8. Process for preventing the eventual crystallization of argols in fresh grape juice comprising reducing the potassium content of the grape juice to such extent that the concentration of potassium bitartrate in the juice is slightly less than saturated, by subjecting the juice to the action of a cation exchanger in hydrogen cycle.

ELDON EVERETT MESCHTER.
KASSON WALKER SEITER.

REFERENCES CITED

The following references are of record in the file of this patent:

UNITED STATES PATENTS

| Number | Name | Date |
| --- | --- | --- |
| 2,104,501 | Adams et al. | Jan. 4, 1938 |
| 2,151,883 | Adams et al. | Mar. 28, 1939 |
| 2,206,007 | Liebnecht | June 25, 1940 |
| 2,155,318 | Liebnecht | Apr. 18, 1939 |
| 2,251,234 | Swain | July 29, 1941 |
| 2,253,061 | Cole | Aug. 19, 1941 |
| 2,258,216 | Ramage | Oct. 7, 1941 |

OTHER REFERENCES

Industrial and Engineering Chemistry, Feb., 1943, pages 186/192. Vol. 35, Number 2. Article by H. W. Tiger et al.

Information Sheet on Recovery of Tartrates From Grape Wastes. Paper A 1C–14 August 1943. Agriculture Research Administration, U. S. Dept. of Agriculture, pages 1 to 10.